US012720049B2

(12) United States Patent
Jung et al.

(10) Patent No.: US 12,720,049 B2
(45) Date of Patent: Aug. 25, 2026

(54) METHOD OF GENERATING ENHANCED FRAME AT VIDEO ENCODER, SYSTEM FOR GENERATING ENHANCED FRAME AT VIDEO ENCODER, AND METHOD OF TRAINING IN-LOOP FILTER MODEL OF VIDEO ENCODER

(71) Applicant: GUANGDONG OPPO MOBILE TELECOMMUNICATIONS CORP., LTD., Dongguan (CN)

(72) Inventors: Cheolkon Jung, Dongguan (CN); Hao Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/173,787

(22) Filed: Apr. 8, 2025

(65) Prior Publication Data

US 2025/0240416 A1 Jul. 24, 2025

Related U.S. Application Data

(63) Continuation of application No. PCT/CN2022/136567, filed on Dec. 5, 2022.

(30) Foreign Application Priority Data

Oct. 13, 2022 (WO) ................ PCT/CN2022/125212

(51) Int. Cl.

| | |
|---|---|
| *H04N 19/117* | (2014.01) |
| *H04N 19/172* | (2014.01) |
| *H04N 19/82* | (2014.01) |

(52) U.S. Cl.
CPC ......... *H04N 19/117* (2014.11); *H04N 19/172* (2014.11); *H04N 19/82* (2014.11)

(58) Field of Classification Search
CPC .... H04N 19/117; H04N 19/172; H04N 19/82; H04N 19/86
See application file for complete search history.

(56) References Cited

U.S. PATENT DOCUMENTS 11,640,710 B2 * 5/2023 Liu ........................ G06V 20/40 382/156
2021/0027098 A1 * 1/2021 Ge ........................ G06F 18/217

FOREIGN PATENT DOCUMENTS

CN 113159048 B * 12/2024 ........... G06F 18/214
WO 2022072659 4/2022

OTHER PUBLICATIONS

Yingbin Wang et al., : Dense Residual Convolutional Neural Network based In-Loop Filter for HEVC; 978-1-5386-4458-4 © 2018 IEEE (Year: 2018).*

(Continued)

*Primary Examiner* — Dramos Kalapodas
(74) *Attorney, Agent, or Firm* — Hodgson Russ LLP

(57) ABSTRACT

A method of generating an enhanced frame at a video encoder is provided. The method may include receiving, by a weakly connected dense attention block (WCDAB) backbone of a convolutional neural network (CNN) of an in-loop filter, a first set of feature extractions as an input. The first set of feature extractions may be associated with a reconstructed frame. The method may include applying, by the WCDAB backbone of the CNN of the in-loop filter, a plurality of depth-wise separable convolutions to the first set of feature extractions to generate a set of global features.

18 Claims, 9 Drawing Sheets

(56) References Cited

OTHER PUBLICATIONS

Soulef Bouaafia et al., : "WC In-Loop Filtering Based on Deep Convolutional Neural Networks"; Computational Intelligence and Neuroscience, vol. 2021 ID: 0012839 (Year: 2021).*
Sijia Chen et al., ; "In-Loop Filter with Residual Convolutional Newural Network for VVC", Multimedia Information Processing and Retrieval (MIPR), © 2020 IEEE; DOI 10.1109/MIPR49039.2020.00038 (Year: 2020).*
WIPO, International Search Report and Written Opinion for International Application No. PCT/CN2022/136567, Jun. 1, 15, 2023.

* cited by examiner

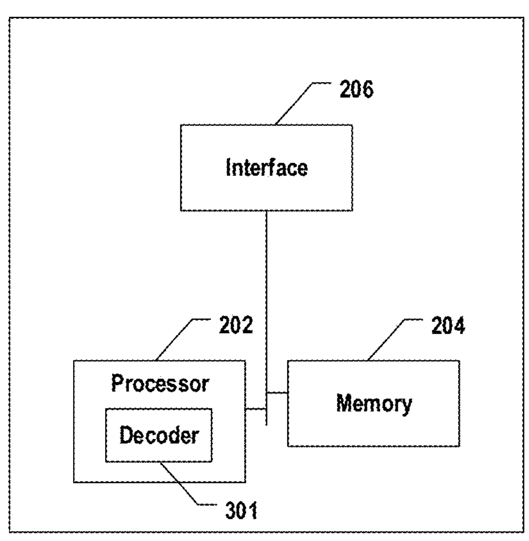
FIG. 3
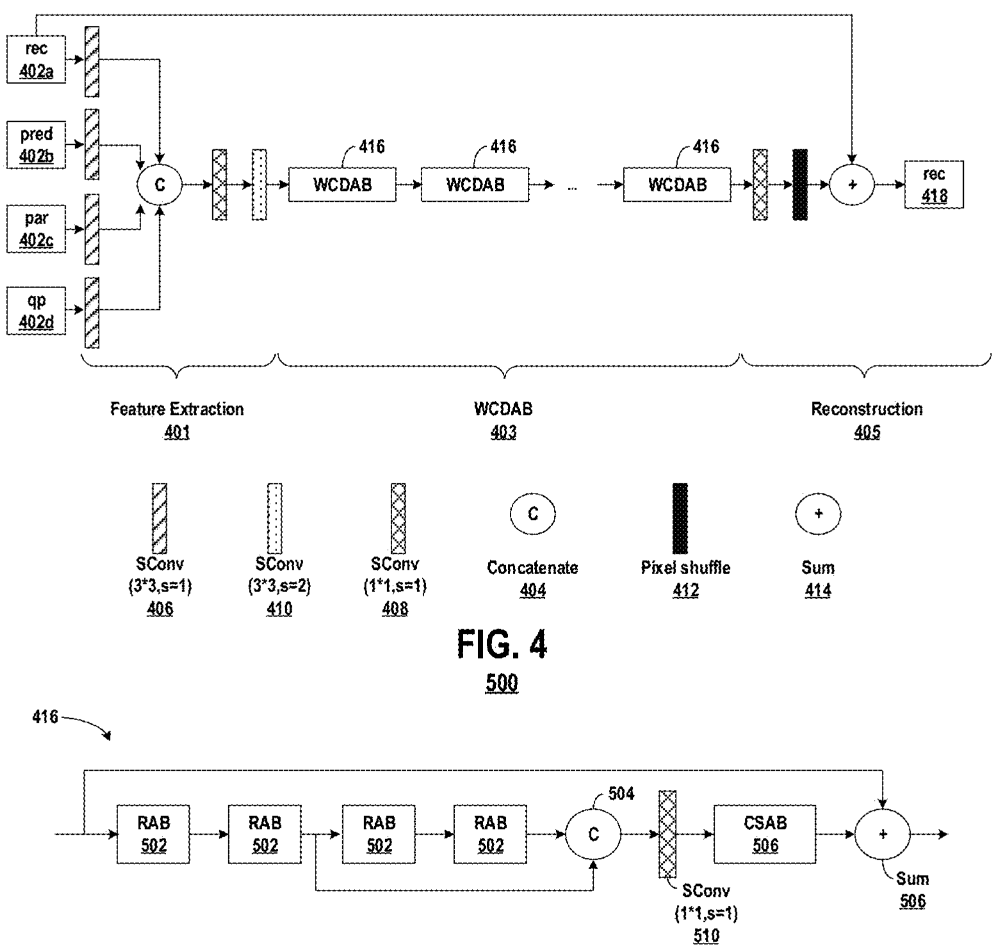
FIG. 4
FIG. 5A 501
502
504
C
CAB
518
+
DConv
(3*3,s=1)
508
DConv
(3*3,s=1)
508
SConv
(1*1,s=1)
510
Sum
506

503
508
DConv
(3*3,s=1)
512
SConv
(1*1,s=1)
510
Leaky
ReLU
516

600
604
606
608
606
610
602
Adaptive avgpool
Linear
ReLU
Linear
Sigmoid
612

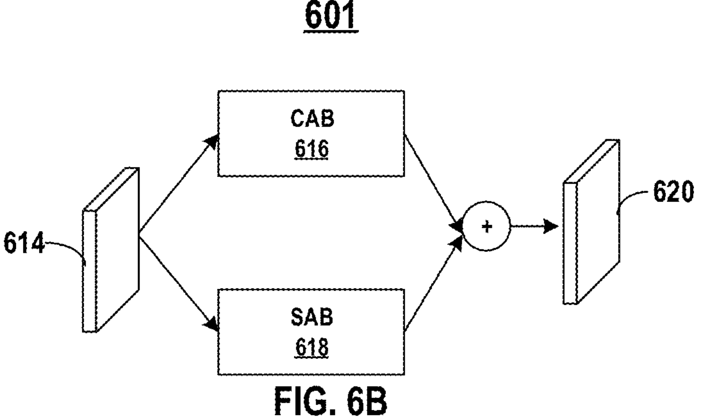
FIG. 6B
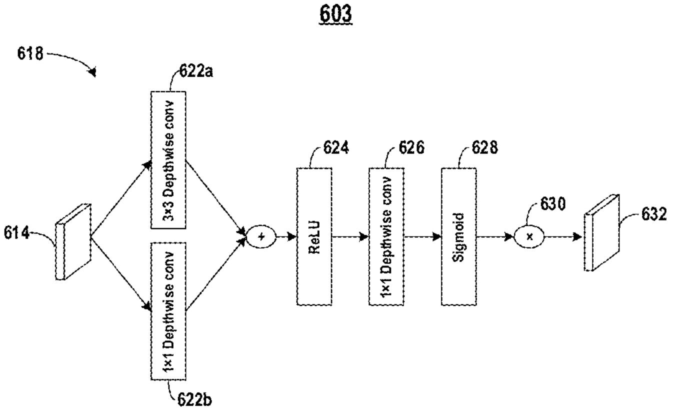
FIG. 6C
700
LMCS
704
DBF
706
SAO
708
ALF
710
Get current compression data
Get current label set
In-Loop filter
702
FIG. 7

METHOD OF GENERATING ENHANCED FRAME AT VIDEO ENCODER, SYSTEM FOR GENERATING ENHANCED FRAME AT VIDEO ENCODER, AND METHOD OF TRAINING IN-LOOP FILTER MODEL OF VIDEO ENCODER

CROSS REFERENCE TO RELATED APPLICATION(S)

This application is a continuation of International Application No. PCT/CN2022/136567, filed Dec. 5, 2022, which claims priority to International Application No. PCT/CN2022/125212, filed Oct. 13, 2022, the entire disclosures of which are incorporated herein by reference.

BACKGROUND

Embodiments of the present disclosure relate to video coding.

Digital video has become mainstream and is used in a wide range of applications including digital television, video telephony, and teleconferencing. These digital video applications are feasible because of the advances in computing and communication technologies, as well as efficient video coding techniques. Various video coding techniques may be used to compress video data, such that coding on the video data can be performed using one or more video coding standards. Exemplary video coding standards may include, but not limited to, versatile video coding (H.266/VVC), high-efficiency video coding (H.265/HEVC), advanced video coding (H.264/AVC), moving picture expert group (MPEG) coding, to name a few.

SUMMARY

According to one aspect of the present disclosure, a method of generating an enhanced frame at a video encoder is provided. The method may include receiving, by a weakly connected dense attention block (WCDAB) backbone of a convolutional neural network (CNN) of an in-loop filter, a first set of feature extractions as an input. The first set of feature extractions may be associated with a reconstructed frame. The method may include applying, by the WCDAB backbone of the CNN of the in-loop filter, a plurality of depth-wise separable convolutions to the first set of feature extractions to generate a set of global features.

According to another aspect of the present disclosure, a system for generating an enhanced frame at a video encoder is provided. The system may include a memory configured to store instructions. The system may include a processor coupled to the memory and configured to, upon executing the instructions, receive, by a WCDAB backbone of a CNN of an in-loop filter, a first set of feature extractions as an input. The first set of feature extractions may be associated with a reconstructed frame. The system may include a processor coupled to the memory and configured to, upon executing the instructions, apply, by the WCDAB backbone of the CNN of the in-loop filter, a plurality of depth-wise separable convolutions to the first set of feature extractions to generate a set of global features.

According to a further aspect of the present disclosure, a method of training an in-loop filter model of a video encoder is provided. The method may include obtaining, by a processor, a compressed dataset that includes a reconstruction frame, a prediction frame, and a partition frame. The compressed dataset may be associated with a first set of quantization parameters (QPs). The method may include applying, by the processor, a deblocking filter (DBF), a sample adaptive offset (SAO), and an adaptive loop filter (ALF) to the compressed data set. The method may include obtaining, by the processor, a label set associated with an enhanced reconstruction frame as an output of the ALF. The label set may be associated with a second set of QPs smaller than the first set of QPs.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 3 illustrates a block diagram of an exemplary decoding system, according to some embodiments of the present disclosure.

FIG. 4 illustrates a detailed block diagram of an exemplary in-loop filter of the encoder of FIG. 2, according to some aspects of the disclosure.

FIG. 5A illustrates a detailed block diagram of an exemplary WCDAB, according to some aspects of the present disclosure.

FIG. 6B illustrates a detailed block diagram of an exemplary channel spatial joint attention block (CSAB), according to some aspects of the present disclosure.

FIG. 6C illustrates a detailed block diagram of an exemplary spatial attention block (SAB), according to some aspects of the present disclosure.

FIG. 7 illustrates a detailed block diagram of an exemplary in-loop filter used for training an in-loop filter model, according to some aspects of the present disclosure.

Figure 1:
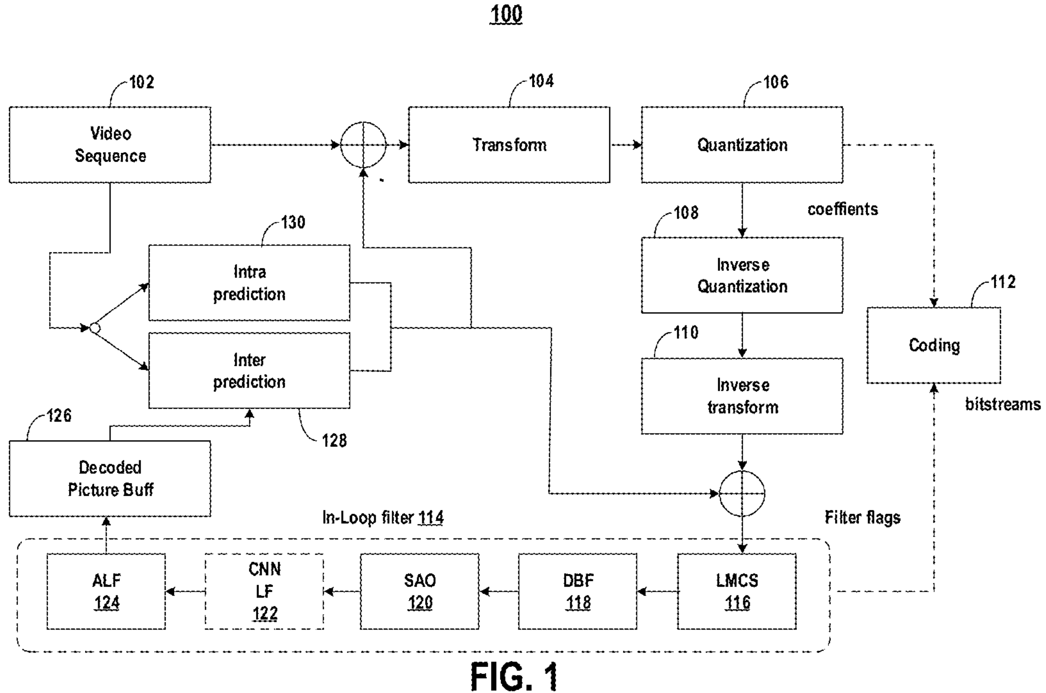
FIG. 1 illustrates a block diagram of a video encoder with an in-loop filter.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of video coding systems will now be described with reference to various apparatus and methods. These apparatus and methods will be described in the following detailed description and illustrated in the accompanying drawings by various modules, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various video coding applications. As described herein, video coding includes both encoding and decoding a video. Encoding and decoding of a video can be performed by the unit of block. For example, an encoding/decoding process such as transform, quantization, prediction, in-loop filtering, reconstruction, or the like may be performed on a coding block, a transform block, or a prediction block. As described herein, a block to be encoded/decoded will be referred to as a "current block." For example, the current block may represent a coding block, a transform block, or a prediction block according to a current encoding/decoding process. In addition, it is understood that the term "unit" used in the present disclosure indicates a basic unit for performing a specific encoding/decoding process, and the term "block" indicates a sample array of a predetermined size. Unless otherwise stated, the "block," "unit," "portion," and "component" may be used interchangeably.

For existing video compression methods, such as HEVC and VVC, blocking and quantization are performed during the encoding process, resulting in irreversible information loss and various compression artifacts, such as blocking, blurring, and banding. This phenomenon is especially pronounced when the compression ratio is high. Currently, there are many methods to improve the quality of compressed images and videos based on deep learning, mainly to reduce blocking artifacts, banding artifacts, and noise.

Versatile video coding (VVC) employs in-loop filters in the encoder to suppress compression artifacts and reduce distortion. These in-loop filters may include a deblocking filter (DBF), a sample adaptive offset (SAO), and an adaptive loop filter (ALF), just to name a few. DBF and SAO are two filters designed to reduce artifacts caused by the encoding process. DBF focuses on visual artifacts at block boundaries, while SAO complementarily reduces artifacts that may arise from quantization of transform coefficients within blocks. ALF may enhance the adaptive filter of the reconstructed signal, reducing the mean square error (MSE) between the original and reconstructed samples using a Wiener-based adaptive filter. Although these filters greatly mitigate compression artifacts, they are handcrafted and developed based on signal processing theory assuming stationary signals. Since natural video sequences are usually non-stationary, their performance is limited. Therefore, the loop filters in VVC still have a lot of room for improvement.

With the development of deep learning, various image and video quality enhancement methods based on CNNs have emerged. Recently, some video encoders have been designed with CNN-based in-loop filters, which include a trained CNN filter embedded in the VVC loop. This may be accomplished by inserting loop filter components or replacing some loop filter components.

FIG. 1 illustrates a block diagram of a video encoder 100 with an in-loop filter 114 with a CNN loop filter (LF) 122. Video encoder 100 may include, e.g., a video sequence component 102, a transform component 104, a quantization component 106, an inverse quantization component 108, an inverse transform component 110, a coding component 112, an in-loop filter 114, a decoded picture buffer 126, an inter-prediction component 128, and an intra-prediction component 130, just to name a few. In-loop filter 114 may include, e.g., a luma mapping with chroma scaling (LMCS) component 116, a DBF 118, an SAO 120, CNN LF 122, and an ALF 124.

Some video encoders use a quantization parameter (QP)-variable CNN-based in-loop filter for VVC intra-coding. To avoid training and deployment in multiple networks, these encoders use a QP attention module (QPAM), which captures compression noise levels for different QPs and emphasize meaningful features along channel dimensions. The QPAM may be embedded in a residual block that is part of a network architecture, which is designed for the controllability of different QPs. To fine tune the network, these video encoders may use a focal mean square error (MSE) loss function. Because the in-loop filter in existing video encoders does not receive multiple inputs, image enhancement performance is limited.

In other video encoders, a dense residual convolutional neural network (DRN) based in-loop filter may be used for VVC. These video encoders use a residual learning component, dense shortcuts, and bottleneck layers to solve the problems of gradient vanishing, encourage feature reuse, and reduce computational resources, respectively. Unfortunately, the performance of these video encoders is unable to achieve a desirable trade-off between complexity and performance.

In still other existing video encoders, a CNN-based filter may be employed to enhance the quality of VVC intra-coded frames by taking auxiliary information such as partitioning and prediction information as inputs. For chroma, the auxiliary information further includes luma samples. Although this filter achieves adequate performance on the Y channel, the performance on other channels is relatively low and with an undesirable encoding latency.

To overcome these and other challenges, the present disclosure provides an exemplary lightweight in-loop CNN filter, which uses an in-loop CNN filter model trained using a multi-stage training strategy. The exemplary in-loop CNN filter described herein achieves improved performance with lower computational complexity, as compared to other in-loop CNN filters.

The exemplary in-loop CNN filter performs depth-wise separable convolutions and attention to improve the objective quality of VVC video frames. The in-loop CNN filter described herein is based on residual learning, which enhances the quality of the input image by learning the residual map. At the same time, the present in-loop filter uses the prediction frame, the partition frame, and the quantization parameter (QP) map as additional auxiliary information to guide the proposed network to better enhance the quality of the enhanced reconstructed frame.

The in-loop CNN filter model described herein may be trained using a multi-stage training strategy to train the model, which leverages progressive learning. For instance, a parameter qp_dis may be set to represent the QP difference between the network input and the label. Since a smaller QP represents higher quality, the QP value of the label is lower than that of the input. First, the exemplary training strategy uses a smaller qp_dis to train the model, and then gradually increases qp_dis in training after the network converges. Since the loss function is a multi-stage loss, the loss function may be combined with the training strategy, which achieves a multi-stage training strategy. The exemplary multi-stage training strategy achieves a model with improved performance, as compared to other in-loop CNN filter models.

Moreover, the in-loop CNN filter described herein may include a WCDAB backbone that is made up of multiple WCDABs. Each WCDAB may include four residual blocks (RABs) and a channel-spatial joint attention block (CSAB). The four RABs extract features from various inputs. The outputs of the second and fourth RABs are fused. Finally, the important features are retained at both channel and spatial levels through the CSAB. With each subsequent WCDAB in the backbone, the proposed in-loop CNN filter achieves better performance. This is because the deep features are more important for residual learning in terms of quality. Two depth-wise separable convolutions may be applied to the inputs of an RAB to extract features. The outputs of the two depth-wise separable convolutions may be fused, and a channel attention block (CAB) may be used to emphasize the important channels of the fused features. Additional details of the exemplary in-loop CNN filter and the exemplary training strategy of its model are provided below in connection with FIGS. 2-12.

Figure 2:
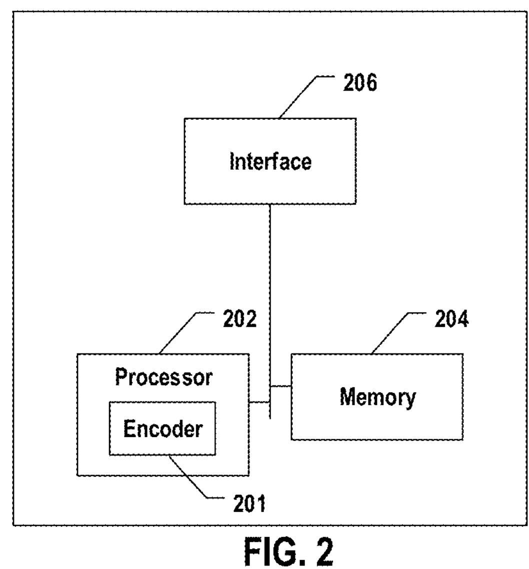
FIG. 2 illustrates a block diagram of an exemplary encoding system, according to some embodiments of the present disclosure.

FIG. 2 illustrates a block diagram of an exemplary encoding system 200, according to some embodiments of the present disclosure. FIG. 3 illustrates a block diagram of an exemplary decoding system 300, according to some embodiments of the present disclosure. Each system 200 or 300 may be applied or integrated into various systems and apparatus capable of data processing, such as computers and wireless communication devices. For example, system 200 or 300 may be the entirety or part of a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having data processing capability. As shown in FIGS. 2 and 3, system 200 or 300 may include a processor 202, a memory 204, and an interface 206. These components are shown as connected to one another by a bus, but other connection types are also permitted. It is understood that system 200 or 300 may include any other suitable components for performing functions described here.

Processor 202 may include microprocessors, such as graphic processing unit (GPU), image signal processor (ISP), central processing unit (CPU), digital signal processor (DSP), tensor processing unit (TPU), vision processing unit (VPU), neural processing unit (NPU), synergistic processing unit (SPU), or physics processing unit (PPU), microcontroller units (MCUs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Although only one processor is shown in FIGS. 2 and 3, it is understood that multiple processors can be included. Processor 202 may be a hardware device having one or more processing cores. Processor 202 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

Memory 204 can broadly include both memory (a.k.a, primary/system memory) and storage (a.k.a., secondary memory). For example, memory 204 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 202. Broadly, memory 204 may be embodied by any computer-readable medium, such as a non-transitory computer-readable medium. Although only one memory is shown in FIGS. 2 and 3, it is understood that multiple memories can be included.

Interface 206 can broadly include a data interface and a communication interface that is configured to receive and transmit a signal in a process of receiving and transmitting information with other external network elements. For example, interface 206 may include input/output (I/O) devices and wired or wireless transceivers. Although only one interface is shown in FIGS. 2 and 3, it is understood that multiple interfaces can be included.

Processor 202, memory 204, and interface 206 may be implemented in various forms in system 200 or 300 for performing video coding functions. In some embodiments, processor 202, memory 204, and interface 206 of system 200 or 300 are implemented (e.g., integrated) on one or more system-on-chips (SoCs). In one example, processor 202, memory 204, and interface 206 may be integrated on an application processor (AP) SoC that handles application processing in an operating system (OS) environment, including running video encoding and decoding applications. In another example, processor 202, memory 204, and interface 206 may be integrated on a specialized processor chip for video coding, such as a GPU or ISP chip dedicated to image and video processing in a real-time operating system (RTOS).

As shown in FIG. 2, in encoding system 200, processor 202 may include one or more modules, such as an encoder 201 (also referred to herein as a "pre-processing network"). Although FIG. 2 shows that encoder 201 is within one processor 202, it is understood that encoder 201 may include one or more sub-modules that can be implemented on different processors located closely or remotely with each other. Encoder 201 (and any corresponding sub-modules or sub-units) can be hardware units (e.g., portions of an integrated circuit) of processor 202 designed for use with other components or software units implemented by processor 202 through executing at least part of a program, i.e., instructions. The instructions of the program may be stored on a computer-readable medium, such as memory 204, and when executed by processor 202, it may perform a process having one or more functions related to video encoding, such as picture partitioning, inter prediction, intra prediction, transformation, quantization, filtering, entropy encoding, etc., as described below in detail.

Similarly, as shown in FIG. 3, in decoding system 300, processor 202 may include one or more modules, such as a decoder 301 (also referred to herein as a "post-processing network"). Although FIG. 3 shows that decoder 301 is within one processor 202, it is understood that decoder 301 may include one or more sub-modules that can be implemented on different processors located closely or remotely with each other. Decoder 301 (and any corresponding sub-modules or sub-units) can be hardware units (e.g., portions of an integrated circuit) of processor 202 designed for use with other components or software units implemented by processor 202 through executing at least part of a program, i.e., instructions. The instructions of the program may be stored on a computer-readable medium, such as memory 204, and when executed by processor 202, it may perform a process having one or more functions related to video decoding, such as entropy decoding, inverse quantization, inverse transformation, inter prediction, intra prediction, filtering, as described below in detail.

Referring back to FIG. 2, encoder 201 may include an exemplary in-loop CNN filter, which performs depth-wise separable convolutions and attention to improve the objective quality of VVC video frames, as described below in connection with FIGS. 4-12.

FIG. 4 illustrates a detailed block diagram of an exemplary in-loop CNN filter 400 (referred to hereinafter as "in-loop CNN filter 400") of encoder 201 of FIG. 2, according to some aspects of the disclosure. Referring to FIG. 4, in-loop CNN filter 400 may include a feature extraction portion 401, a WCDAB backbone 403, and a reconstruction portion 405.

Inputs into in-loop CNN filter 400 may include, e.g., a reconstruction frame (rec) 402*a*, a prediction frame (pred) 402*b*, a partition frame (par) 402*c*, and a QP map (qp) 402*d*, which are each generated by encoder 201. Reconstruction frame 402*a* is a reconstruction of the current video frame by encoder 201 for quality enhancement. Prediction frame 402*b* is the prediction of reconstruction frame 402*a* by encoder 201. Partition frame 402*c* is the partition information corresponding to reconstruction frame 402*a*. QP map 402*d* is used to indicate the QP value corresponding to the reconstruction frame. QP map 402*d* may improve the quality of the reconstruction frames at different QPs at reconstruction portion 405.

Feature extraction portion 401 may include multiple parallel convolutional layers 406 (standard convolutions), and each parallel convolutional layer 406 is used to integrate and extract the shallow features of its corresponding input. Afterwards, the output features of each of the parallel convolutional layers 406 are concatenated 404 and fused using a convolutional layer 408 with stride 1 to obtain the fused shallow features. Then, a convolutional layer 410 with stride 2 is used to downsample the fused features to reduce the computation of the proposed network. Finally, the downsampled features (e.g., a first set of feature extractions) are sent to WCDAB backbone 403.

WCDAB backbone 403 may include a plurality of WCDABs 416. In some embodiments, WCDAB backbone 403 may include eight or more WCDABs 416, for example. WCDAB backbone 403 may extract a global feature map (e.g., a set of global features) from the first set of feature extractions received from feature extraction portion 401.

Reconstruction portion 405 uses a 1×1 convolutional layer 408 to reduce the channel dimension of the global feature map obtained from WCDAB backbone 403. Then, reconstruction portion 405 may use a pixel shuffle component 412 to upsample the dimension-reduced features to obtain a three-channel residual map. Finally, the obtained residual map is added by a summation component 414 to reconstruction frame 402*a*, thereby generating an enhanced reconstruction frame 418.

Figures 5B, 5C, 6A:
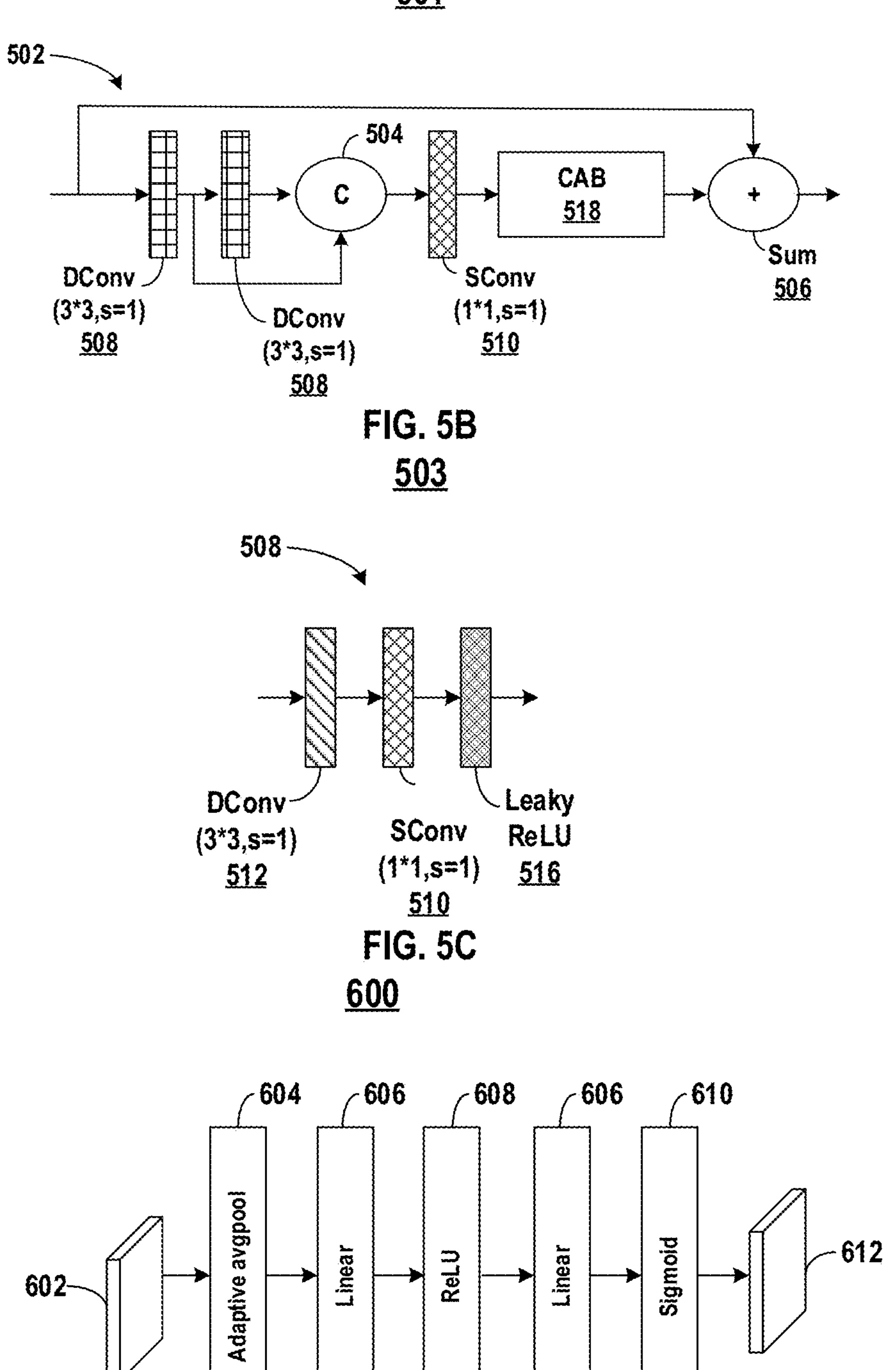
FIG. 5B illustrates a detailed block diagram of an exemplary residual attention block (RAB), according to some aspects of the present disclosure.
FIG. 5C illustrates a detailed block diagram of a depthwise convolutional layer, according to some aspects of the present disclosure.
FIG. 6A illustrates a detailed block diagram of an exemplary channel attention block (CAB), according to some aspects of the present disclosure.

FIG. 5A illustrates a detailed block diagram 500 of the exemplary WCDAB 416 of FIG. 4, according to some aspects of the present disclosure. FIG. 5B illustrates a detailed block diagram 501 of an exemplary RAB 502, according to some aspects of the present disclosure. FIG. 5C illustrates a detailed block diagram 503 of a depth-wise separable convolutional layer 508, according to some aspects of the present disclosure. FIGS. 5A-5C will be described together.

Referring to FIG. 5A, WCDAB 416 may include, e.g., multiple residual attention blocks (RABs) 502, a standard convolutional layer 510, and a CSAB 506. Four RABs 502 are shown in FIG. 5A as a non-limiting example. Each RAB 502 may extract features from the input. The outputs of the second and fourth RAB 502 may be concatenated 504 and fused by standard convolutional layer 510 with a 1×1 convolution to generate a fused feature map. The fused feature map may be input into CSAB 506. CSAB 506 may retain important features at the channel and spatial level.

Referring to FIG. 5B, in each RAB 502, two depth-wise separable convolutional layers 508 are first used to obtain two feature maps with different receptive fields, then the two feature maps are concatenated 504 and fused using a standard convolutional layer 510. A channel attention block (CAB) 518 is used to emphasize the important channels generated by the two depth-wise separable convolutional layers 508 and fused by the standard convolutional layer 510. As shown in FIG. 5C, depth-wise separable convolutional layer 508 may include a depth-wise convolution 512, followed by a standard convolutional layer 510, and a Leaky Rectified Linear Activation Function (ReLU) layer 516.

FIG. 6A illustrates a detailed block diagram 600 of exemplary CAB 518 depicted in FIG. 5B, according to some aspects of the present disclosure. FIG. 6B illustrates a detailed block diagram 601 of exemplary CSAB 506 depicted in FIG. 5A, according to some aspects of the present disclosure. FIG. 6C illustrates a detailed block diagram 603 of an exemplary SAB 618 depicted in FIG. 6B, according to some aspects of the present disclosure. FIGS. 6A-6C will be described together.

Referring to FIG. 6A, the architecture of CAB 518 is shown. CAB 518 may extract the weight of each channel 602 through global average pooling 604, channel compression 606, and expansion 608. Then, the extracted weight is multiplied by the input feature map by a sigmoid layer 610 to obtain the channel attention map 612.

Referring to FIG. 6B, since the quality of each WCDAB output directly affects the final performance of the in-loop CNN filter, channel attention applied at the end of WCDAB 416 may still miss some suppressed channels, which contain important feature information. Therefore, CSAB 506 is designed to refine the output features of WCDAB 416. As shown in FIG. 6B, CSAB 506 includes two parallel branches: channel attention block (CAB) 616 and spatial attention block (SAB) 618. Through these two branches, the input feature map 614 retains important feature information in the channel and spatial dimensions, respectively, and then fuses the two parts of information to obtain the final output 620.

Referring to FIG. 6C, for the input feature map 614, parallel depth-wise separable convolutional layers 622*a* and 622*b* of different sizes to convolve input feature map 614. Then, the results of the two convolutions are summed, and a ReLU layer 624 activates the results. After that, another depth-wise separable convolution 626 is applied, followed by a sigmoid layer 628 to obtain a spatial attention mask. Finally, a multiplier 630 multiplies the spatial attention map with input feature map 614 to obtain the final spatial attention map 632.

FIG. 7 illustrates a detailed block diagram 700 of an exemplary in-loop filter 702 used for training an in-loop filter model, according to some aspects of the present disclosure.

Referring to FIG. 7, in-loop filter 702 may include an LMCS 704, a DBF 706, an SAO 708, and an ALF 710. A compressed dataset (e.g., the reconstruction frame, the prediction frame, and the partition frame) may be obtained after LMCS 704, while the label set may be obtained after ALF 710. The compression dataset and the label set may be used to train the exemplary in-loop CNN filter described herein. To that end, a weighted L1 loss and L2 loss may be used to train the CNN filter (e.g., a weakly connected dense attention neural network (WCDANN) using a loss function f(x), which is shown below as expression (1).

$$f(x)=8\times \text{Loss}_y+\text{Loss}_u+\text{Loss}_v \quad (1),$$

where Loss indicates L1 loss or L2 loss in the y, u, and v channels. In some examples, L1 loss may be used in the first and mid-training periods, and L2 loss may be used in the late training period.

Figure 8A:
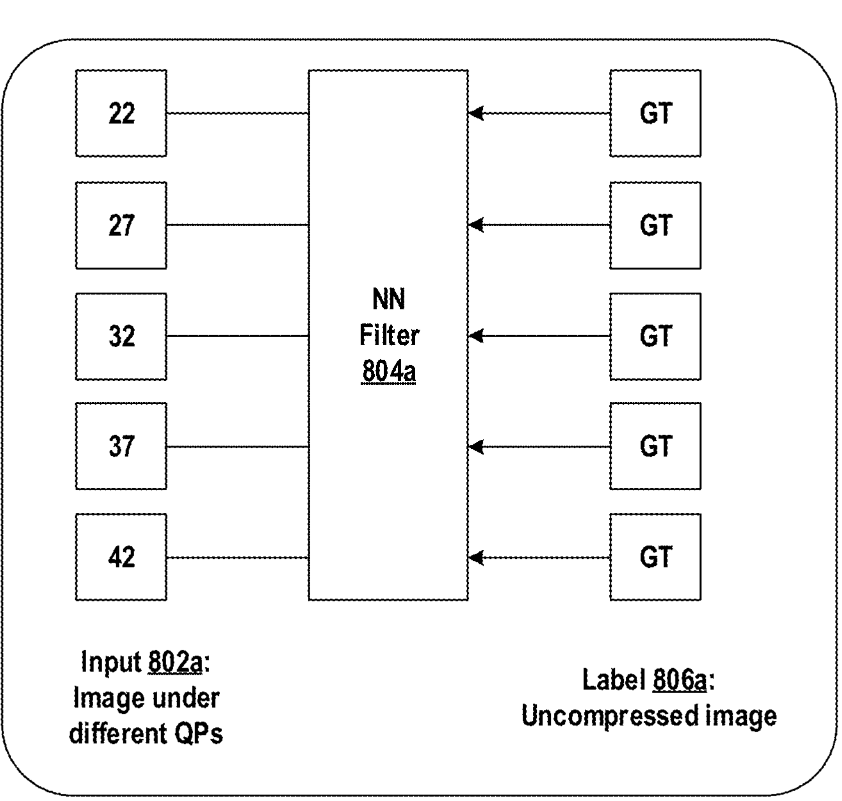
FIG. 8A illustrates a block diagram of an example in-loop filter training strategy.
Figure 8B:
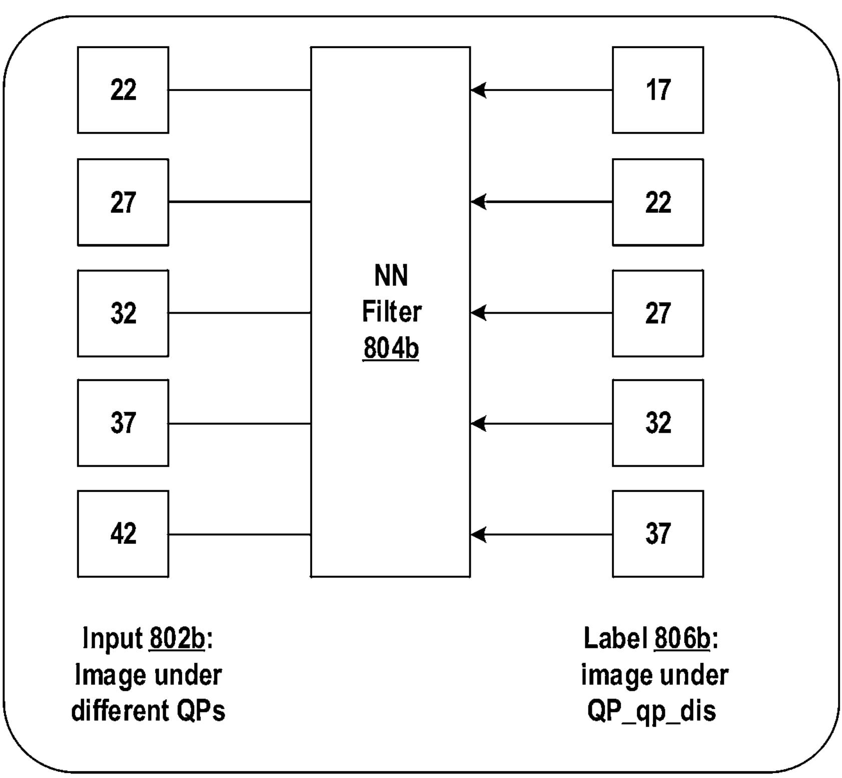
FIG. 8B illustrates a block diagram of an exemplary in-loop filter training strategy, according to some aspects of the present disclosure.

FIG. 8A illustrates a block diagram of an example in-loop filter training strategy 800 for training an example neural network (NN) filter 804*a*. FIG. 8B illustrates a block diagram of a network 801 that implements an exemplary in-loop filter training strategy, according to some aspects of the present disclosure. FIGS. 8A and 8B will be described together.

Referring to FIG. 8A, the network training usually takes uncompressed images as labels 806*a*. However, since the inputs 802*a* are compressed with different QPs, the distance between the compressed images and the labels is different, which leads to learning difficulty of the network for all training data. Moreover, the distance severely limits the overall performance of the network.

Referring to FIG. 8B, exemplary in-loop filter training strategy implemented by network 801 maximizes the learning ability of the network using inputs 802*b* (e.g., compressed images) with different QPs. For the inputs 802*b* with current QP, network 801 may use the lower QP compressed images to replace the uncompressed images as labels to train NN filter 804*b*. In this way, the distance between the input 802*b* and label 806*b* remains consistent, thereby improving the stability of the network performance and solving the drawbacks of traditional training methods.

Figure 9:
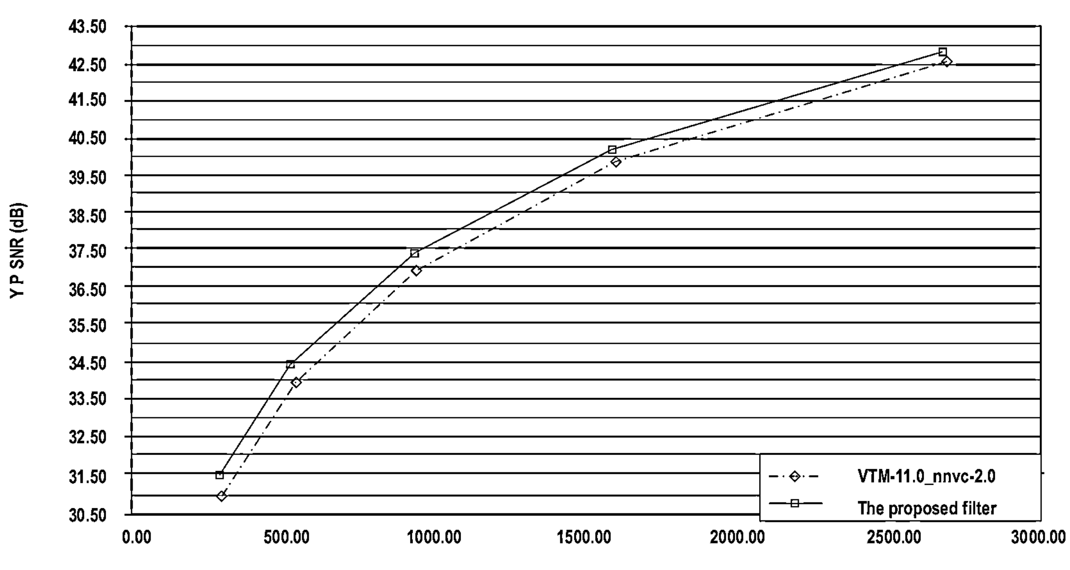
FIG. 9 illustrates a first graphical representation of peak-signal-to-noise ratio (PSNR) versus bit-rate for video encoding using the exemplary in-loop filter, according to some aspects of the present disclosure.
Figure 10:
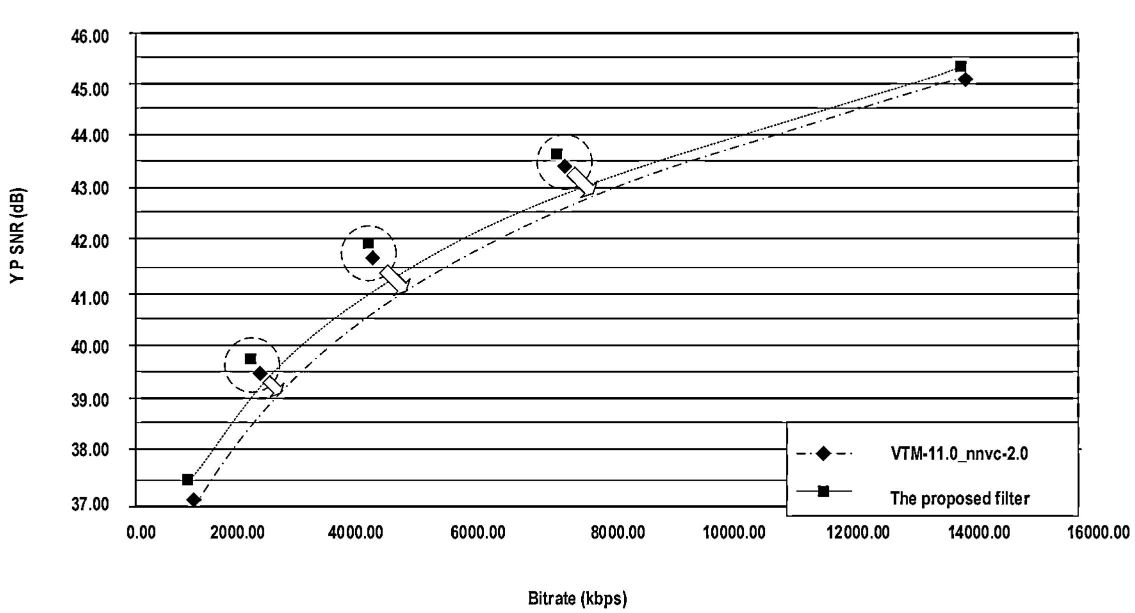
FIG. 10 illustrates a second graphical representation of PSNR versus bit-rate for video encoding using the exemplary in-loop filter, according to some aspects of the present disclosure.

Still referring to FIG. 8B, network 801 may set a parameter qp_dis, which represents the QP difference between the input 802*a* and the label 806*b*. Since the smaller QP represents higher quality, the QP value of label 806*b* is lower than that of the input 802*b*. First, network 801 may use a smaller qp_dis to train NN filter 804*b* until convergence. Then, network 801 may gradually increase qp_dis and continue to train NN filter 804*b*. Since the loss function is a multi-stage loss, network 801 combines the loss function with the training strategy to achieve a multi-stage training strategy. First, network 801 sets qp_dis=5 and trains NN filter 804*b* with L1 and L2 loss functions successively. Then, network 801 increases qp_dis by 10, and trains NN filter 804*b* again with L1 and L2 loss functions. After that, network 801 again increases qp_dis and trains NN filter 804*b* with the L1 and L2 loss functions. In this way, the exemplary in-loop filter training strategy achieves network convergence and maximizes the learning ability of network 801. FIG. 9 illustrates a first graphical representation 900 of PSNR versus bit-rate for video encoding using the exemplary in-loop CNN filter, according to some aspects of the present disclosure. FIG. 10 illustrates a second graphical representation 1000 of PSNR versus bit-rate for video encoding using the exemplary in-loop filter, according to some aspects of the present disclosure.

Referring again to FIG. 8B, because NN filter 804*b* processes YUV images, the image characteristics of the UV channel and the Y channel are different. For example, when qp_dis=5, the difference in image quality corresponding to Y channel is far greater than that of UV channel. Therefore, in actual training, qp_dis may only be used for the Y channel. For the UV channel, its label uses the uncompressed image. However, when different filters are used to process Y and UV channels independently, the problem of image difference between Y and UV channels no longer exists, and the proposed training strategy can be applied to different filters.

Figure 11:
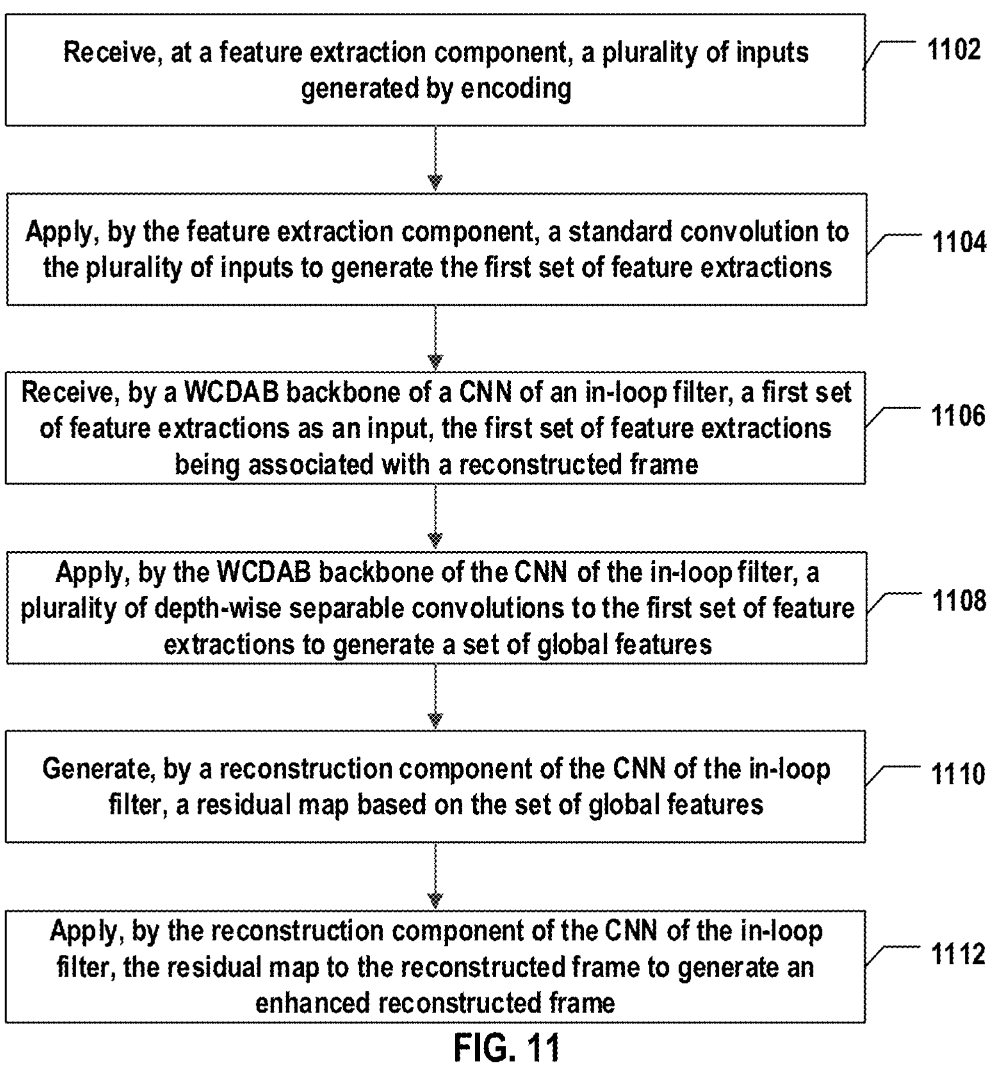
FIG. 11 illustrates a flow chart of a first exemplary method of video coding, according to some aspects of the present disclosure.

FIG. 11 illustrates a flow chart of an exemplary method 1100 of video encoding, according to some embodiments of the present disclosure. Method 1100 may be performed by an apparatus, e.g., such as encoder 201, in-loop CNN filter 400, or any other suitable video encoding and/or compression systems. Method 1100 may include operations 1102-

1112 as described below. It is understood that some of the operations may be optional, and some of the operations may be performed simultaneously, or in a different order other than shown in FIG. 11.

Referring to FIG. 11, at 1102, the apparatus receives, at a feature extraction component, a plurality of inputs generated by encoding. For example, referring to FIG. 4, inputs into in-loop CNN filter 400 may include, e.g., a reconstruction frame (rec) 402*a*, a prediction frame (pred) 402*b*, a partition frame (par) 402*c*, and a QP map (qp) 402*d*, which are each generated by encoder 201. Reconstruction frame 402*a* is a reconstruction of the current video frame by encoder 201 for quality enhancement. Prediction frame 402*b* is the prediction of reconstruction frame 402*a* by encoder 201. Partition frame 402*c* is the partition information corresponding to reconstruction frame 402*a*. QP map 402*d* is used to indicate the QP value corresponding to the reconstruction frame. QP map 402*d* may improve the quality of the reconstruction frames at different QPs at reconstruction portion 405.

At 1104, the apparatus may apply, by the feature extraction component, a standard convolution to the plurality of inputs to generate the first set of feature extractions. For example, referring to FIG. 4, feature extraction portion 401 may include multiple parallel convolutional layers 406 (standard convolutions), and each parallel convolutional layer 406 is used to integrate and extract the shallow features of its corresponding input. Afterwards, the output features of each of the parallel convolutional layers 406 are concatenated 404 and fused using a convolutional layer 408 with stride 1 to obtain the fused shallow features. Then, a convolutional layer 410 with stride 2 is used to reduce the computation of the network. Finally, the downsampled features (e.g., a first set of feature extractions) are sent to WCDAB backbone 403.

At 1106, the apparatus may receive, by a WCDAB backbone of a CNN of an in-loop filter, a first set of feature extractions as an input, the first set of feature extractions being associated with a reconstructed frame. For example, referring to FIG. 4, WCDAB backbone 403 may receive the first set of feature extractions from feature extraction portion 401.

At 1108, the apparatus may apply, by the WCDAB backbone of the CNN of the in-loop filter, a plurality of depth-wise separable convolutions to the first set of feature extractions to generate a set of global features. For example, referring to FIG. 4, WCDAB backbone 403 may extract a global feature map (e.g., a set of global features) from the first set of feature extractions received from feature extraction portion 401.

At 1110, the apparatus may generate, by a reconstruction component of the CNN of the in-loop filter, a residual map based on the set of global features. For example, referring to FIG. 4, reconstruction portion 405 uses a 1×1 convolutional layer 408 to reduce the channel dimension of the global feature map obtained from WCDAB backbone 403. Then, reconstruction portion 405 may use a pixel shuffle component 412 to upsample the dimension-reduced features to obtain a three-channel residual map.

At 1112, the apparatus may apply, by the reconstruction component of the CNN of the in-loop filter, the residual map to the reconstructed frame to generate an enhanced reconstructed frame. For example, referring to FIG. 4, the obtained residual map is added to reconstruction frame 402*a*, thereby generating an enhanced reconstruction frame 418.

Figure 12:
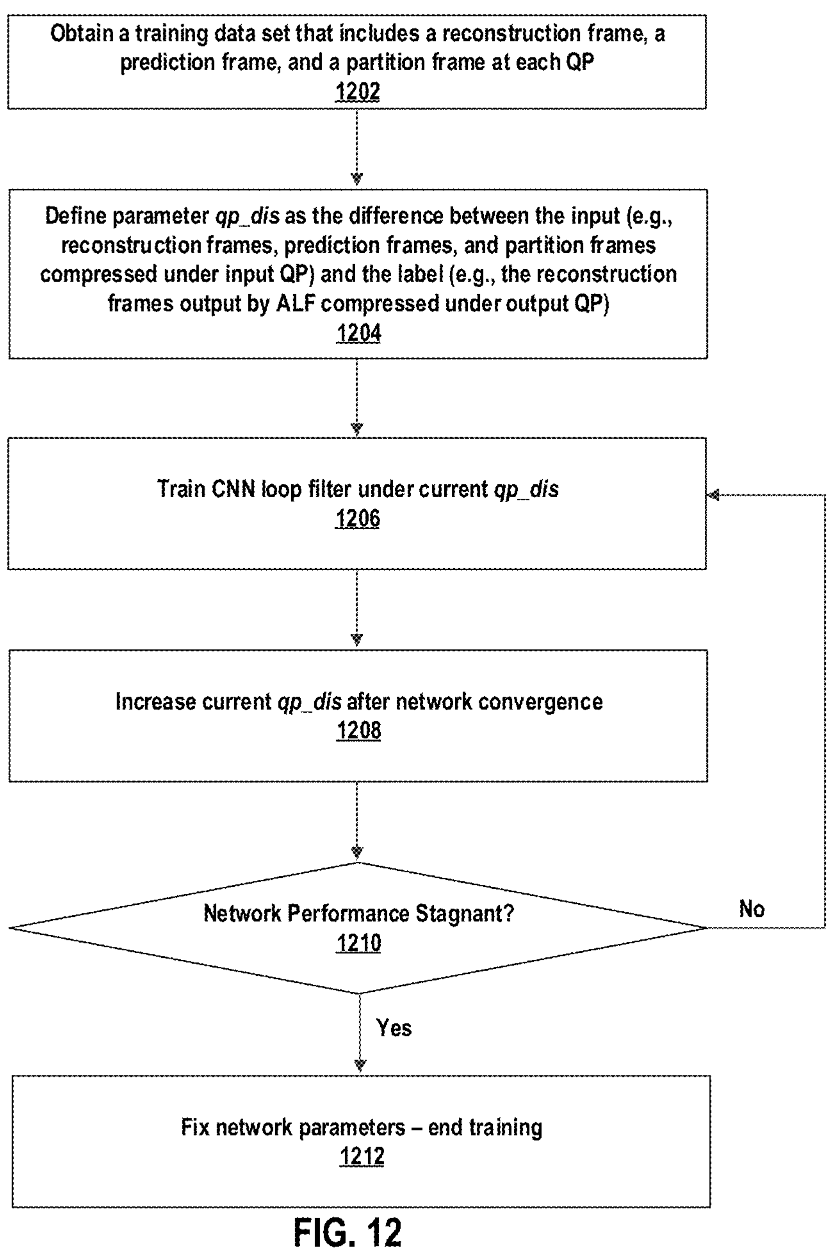
FIG. 12 illustrates a flow chart of a second exemplary method of video coding, according to some aspects of the present disclosure.

FIG. 12 illustrates a flow chart of an exemplary method 1200 of training an in-loop CNN filter mode, according to some embodiments of the present disclosure. Method 1200 may be performed by an apparatus, e.g., encoder 201, network 801, or any other suitable video encoding and/or compression systems. Method 1200 may include operations 1202-1212 as described below. It is understood that some of the operations may be optional, and some of the operations may be performed simultaneously, or in a different order other than shown in FIG. 12.

Referring to FIG. 12, at 1202, the apparatus may obtain, by a processor, a training data set that includes a reconstruction frame, a prediction frame, and a partition frame at each QP. For example, referring to FIG. 8B, exemplary in-loop filter training strategy implemented by network 801 maximizes the learning ability of the network using inputs 802*b* with different QPs.

At 1204, the apparatus may apply, by the processor, a DBF, an SAO, and an ALF to the compressed data set. For example, referring to FIG. 7, in-loop filter 702 may include an LMCS 704, a DBF 706, an SAO 708, and an ALF 710. A compressed dataset (e.g., the reconstruction frame, the prediction frame, and the partition frame) may be obtained after LMCS 704, while the label set may be obtained after ALF 710. DBF 706, SAO 708, and ALF 710 may be applied to the compressed dataset to obtain the label set.

At 1206, the apparatus may obtain, by the processor, a label set associated with an enhanced reconstruction frame as an output of the ALF and associated with a second set of QPs smaller than the first set of QPs. For example, referring to FIG. 7, a compressed dataset (e.g., the reconstruction frame, the prediction frame, and the partition frame) may be obtained after LMCS 704, while the label set may be obtained after ALF 710. DBF 706, SAO 708, and ALF 710 may be applied to the compressed dataset to obtain the label set.

At 1204, the apparatus may define, by the processor, parameter qp_dis as the difference between the input (e.g., reconstruction frames, prediction frames, and partition frames compressed under input QP) and the label (e.g., the reconstruction frames output by ALF compressed under output QP). For example, referring to FIG. 8B, network 801 may set a parameter qp_dis, which represents the QP difference between the input 802*a* and the label 806*b*. Since the smaller QP represents higher quality, the QP value of label 806*b* is lower than that of the input 802*b*.

At 1206, the apparatus may train CNN loop filter under current qp_dis. For example, referring to FIG. 8B, network 801 may use a smaller qp_dis to train NN filter 804*b*.

At 1208, the apparatus may increase current qp_dis after network convergence. For example, referring to FIG. 8B, network 801 may use a smaller qp_dis to train NN filter 804*b* until convergence. Then, network 801 may gradually increase qp_dis and continue to train NN filter 804*b*. Since the loss function is a multi-stage loss, network 801 combines the loss function with the training strategy to achieve a multi-stage training strategy. First, network 801 sets qp_dis=5 and trains NN filter 804*b* with L1 and L2 loss functions successively. Then, network 801 increases qp_dis by 10, and trains NN filter 804*b* again with L1 and L2 loss functions. After that, network 801 again increases qp_dis and trains NN filter 804*b* with the L1 and L2 loss functions.

At 1210, the apparatus may determine whether the network performance is stagnant. For example, referring to FIG. 8B, network 801 may determine whether its performance increases with a subsequent training using an increased qp_dis. If no, the operations may return to 1206; if yes, the operations may move to 1212.

At 1212, the apparatus may fix the network parameters and end training. For example, referring to FIG. 8B, once the network parameters are fixed, the in-loop CNN filter model used by NN filter 804$b$ is generated. In this way, the exemplary in-loop filter training strategy achieves network convergence and maximizes the learning ability of network 801.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a processor, such as processor 202 in FIGS. 2 and 3. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a method of generating an enhanced frame at a video encoder is provided. The method may include receiving, by a WCDAB backbone of a CNN of an in-loop filter, a first set of feature extractions as an input. The first set of feature extractions may be associated with a reconstructed frame. The method may include applying, by the WCDAB backbone of the CNN of the in-loop filter, a plurality of depth-wise separable convolutions to the first set of feature extractions to generate a set of global features.

In some embodiments, the method may include generating, by a reconstruction component of the CNN of the in-loop filter, a residual map based on the set of global features. In some embodiments, the method may include applying, by the reconstruction component of the CNN of the in-loop filter, the residual map to the reconstructed frame to generate an enhanced reconstructed frame.

In some embodiments, the method may include receiving, by a feature extraction component of the CNN of the in-loop filter, a plurality of inputs generated by encoding. In some embodiments, the method may include applying, by the feature extraction component of the CNN of the in-loop filter, a standard convolution to the plurality of inputs to generate the first set of feature extractions.

In some embodiments, the plurality of inputs include the reconstructed frame, a prediction frame, a partition frame, and a QP map.

In some embodiments, the applying, by the WCDAB backbone of the CNN of the in-loop filter, the plurality of depth-wise separable convolutions to the first set of feature extractions to generate the set of global features may include applying a first depth-wise convolution of a RAB to the first set of feature extractions to generate a first feature map with a first field. In some embodiments, the applying, by the WCDAB backbone of the CNN of the in-loop filter, the plurality of depth-wise separable convolutions to the first set of feature extractions to generate the set of global features may include applying a second depth-wise convolution of the RAB to the first set of feature extractions to generate a second feature map with a second field different than the first field.

In some embodiments, the applying, by the WCDAB backbone of the CNN of the in-loop filter, the plurality of depth-wise separable convolutions to the first set of feature extractions to generate the set of global features may include concatenating the first feature map and the second feature map. In some embodiments, the applying, by the WCDAB backbone of the CNN of the in-loop filter, the plurality of depth-wise separable convolutions to the first set of feature extractions to generate the set of global features may include generating a fused feature map by applying a standard convolution to the first feature map and the second feature map following the concatenating. In some embodiments, the applying, by the WCDAB backbone of the CNN of the in-loop filter, the plurality of depth-wise separable convolutions to the first set of feature extractions to generate the set of global features may include inputting the fused feature map into a CAB to identify a set of channels from the fused feature map. In some embodiments, the fused feature map may include the set of global features.

In some embodiments, the generating, by the reconstruction component of the CNN of the in-loop filter, the residual map based on the set of global features may include inputting the set of channels identified from the fused feature map into a CAB and a SAB of a CSAB. In some embodiments, the generating, by the reconstruction component of the CNN of the in-loop filter, the residual map based on the set of global features may include generating a set of channel dimension features from the set of channels using the CAB. In some embodiments, the generating, by the reconstruction component of the CNN of the in-loop filter, the residual map based on the set of global features may include generating a set of spatial dimension features from the set of channels using the SAB. In some embodiments, the generating, by the reconstruction component of the CNN of the in-loop filter, the residual map based on the set of global features may include fusing the set of channel dimension features and the set of spatial dimension features to generate the residual map.

In some embodiments, the set of spatial dimension features are generated by applying a third depth-wise convolution of a first size and a fourth depth-wise convolution of a second size different than the first size to the set of channels.

According to another aspect of the present disclosure, a system for generating an enhanced frame at a video encoder is provided. The system may include a memory configured to store instructions. The system may include a processor coupled to the memory and configured to, upon executing the instructions, receive, by a WCDAB backbone of a CNN of an in-loop filter, a first set of feature extractions as an input. The first set of feature extractions may be associated with a reconstructed frame. The system may include a processor coupled to the memory and configured to, upon executing the instructions, apply, by the WCDAB backbone of the CNN of the in-loop filter, a plurality of depth-wise separable convolutions to the first set of feature extractions to generate a set of global features.

In some embodiments, the processor coupled to the memory may be further configured to, upon executing the instructions, generate, by a reconstruction component of the CNN of the in-loop filter, a residual map based on the set of global features. In some embodiments, the processor coupled to the memory may be further configured to, upon executing the instructions, apply, by the reconstruction component of the CNN of the in-loop filter, the residual map to the reconstructed frame to generate an enhanced reconstructed frame.

In some embodiments, the processor coupled to the memory may be further configured to, upon executing the instructions, receive, by a feature extraction component of the CNN of the in-loop filter, a plurality of inputs generated by encoding. In some embodiments, the processor coupled to the memory may be further configured to, upon executing the instructions, apply, by the feature extraction component of the CNN of the in-loop filter, a standard convolution to the plurality of inputs to generate the first set of feature extractions.

In some embodiments, the plurality of inputs may include the reconstructed frame, a prediction frame, a partition frame, and a QP map.

In some embodiments, the processor coupled to the memory may be configured to, upon executing the instructions, apply, by the WCDAB backbone of the CNN of the in-loop filter, the plurality of depth-wise separable convolutions to the first set of feature extractions to generate the set of global features by applying a first depth-wise convolution of a RAB to the first set of feature extractions to generate a first feature map with a first field. In some embodiments, the processor coupled to the memory may be configured to, upon executing the instructions, apply, by the WCDAB backbone of the CNN of the in-loop filter, the plurality of depth-wise separable convolutions to the first set of feature extractions to generate the set of global features by applying a second depth-wise convolution of the RAB to the first set of feature extractions to generate a second feature map with a second field different than the first field.

In some embodiments, the processor coupled to the memory may be configured to, upon executing the instructions, apply, by the WCDAB backbone of the CNN of the in-loop filter, the plurality of depth-wise separable convolutions to the first set of feature extractions to generate the set of global features by concatenating the first feature map and the second feature map. In some embodiments, the processor coupled to the memory may be configured to, upon executing the instructions, apply, by the WCDAB backbone of the CNN of the in-loop filter, the plurality of depth-wise separable convolutions to the first set of feature extractions to generate the set of global features by generating a fused feature map by applying a standard convolution to the first feature map and the second feature map following the concatenating. In some embodiments, the processor coupled to the memory may be configured to, upon executing the instructions, apply, by the WCDAB backbone of the CNN of the in-loop filter, the plurality of depth-wise separable convolutions to the first set of feature extractions to generate the set of global features by inputting the fused feature map into a CAB to identify a set of channels from the fused feature map. In some embodiments, the fused feature map may include the set of global features.

In some embodiments, the processor coupled to the memory may be configured to, upon executing the instructions, generate, by the reconstruction component of the CNN of the in-loop filter, the residual map based on the set of global features by inputting the set of channels identified from the fused feature map into a CAB and a SAB of a CSAB. In some embodiments, the processor coupled to the memory may be configured to, upon executing the instructions, generate, by the reconstruction component of the CNN of the in-loop filter, the residual map based on the set of global features by generating a set of channel dimension features from the set of channels using the CAB. In some embodiments, the processor coupled to the memory may be configured to, upon executing the instructions, generate, by the reconstruction component of the CNN of the in-loop filter, the residual map based on the set of global features by generating a set of spatial dimension features from the set of channels using the SAB. In some embodiments, the processor coupled to the memory may be configured to, upon executing the instructions, generate, by the reconstruction component of the CNN of the in-loop filter, the residual map based on the set of global features by fusing the set of channel dimension features and the set of spatial dimension features to generate the residual map.

In some embodiments, the set of spatial dimension features may be generated by applying a third depth-wise convolution of a first size and a fourth depth-wise convolution of a second size different than the first size to the set of channels.

According to a further aspect of the present disclosure, a method of training an in-loop filter model of a video encoder is provided. The method may include obtaining, by a processor, a compressed dataset that includes a reconstruction frame, a prediction frame, and a partition frame. The compressed dataset may be associated with a first set of QPs. The method may include applying, by the processor, a DBF, an SAO, and an ALF to the compressed data set. The method may include obtaining, by the processor, a label set associated with an enhanced reconstruction frame as an output of the ALF. The label set may be associated with a second set of QPs smaller than the first set of QPs.

In some embodiments, the method may include generating, by the processor, the in-loop filter model based on a multi-stage loss function and the label set including the second set of QPs smaller than the first set of QPs.

According to yet another aspect of the present disclosure a system for training an in-loop filter model of a video encoder is provided. The system may include a memory configured to store instructions. The system may include a processor coupled to the memory and configured to, upon executing the instructions, obtain a compressed dataset that includes a reconstruction frame, a prediction frame, and a partition frame. The compressed dataset may be associated with a first set of QPs. The system may include a processor coupled to the memory and configured to, upon executing the instructions, apply a DBF, an SAO, and an ALF to the compressed data set. The system may include a processor coupled to the memory and configured to, upon executing the instructions, obtain a label set associated with an enhanced reconstruction frame as an output of the ALF. The label set is associated with a second set of QPs smaller than the first set of QPs.

In some embodiments, the processor coupled to the memory may be further configured to, upon executing the instructions, generate the in-loop filter model based on a multi-stage loss function and the label set including the second set of QPs smaller than the first set of QPs.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method of generating an enhanced frame at a video encoder, comprising:

receiving, by a weakly connected dense attention block (WCDAB) backbone of a convolutional neural network (CNN) of an in-loop filter, a first set of feature extractions as an input, the first set of feature extractions being associated with a reconstructed frame; and applying, by the WCDAB backbone of the CNN of the in-loop filter, a plurality of depth-wise separable convolutions to the first set of feature extractions to generate a set of global features.

2. The method of claim 1, further comprising:

generating, by a reconstruction component of the CNN of the in-loop filter, a residual map based on the set of global features; and applying, by the reconstruction component of the CNN of the in-loop filter, the residual map to the reconstructed frame to generate an enhanced reconstructed frame.

3. The method of claim 2, further comprising:

receiving, by a feature extraction component of the CNN of the in-loop filter, a plurality of inputs generated by encoding; and applying, by the feature extraction component of the CNN of the in-loop filter, a standard convolution to the plurality of inputs to generate the first set of feature extractions.

4. The method of claim 3, wherein the plurality of inputs include the reconstructed frame, a prediction frame, a partition frame, and a quantization parameter (QP) map.

5. The method of claim 2, wherein the applying, by the WCDAB backbone of the CNN of the in-loop filter, the plurality of depth-wise separable convolutions to the first set of feature extractions to generate the set of global features comprises:

applying a first depth-wise convolution of a residual attention block (RAB) to the first set of feature extractions to generate a first feature map with a first field; and applying a second depth-wise convolution of the RAB to the first set of feature extractions to generate a second feature map with a second field different than the first field.

6. The method of claim 5, wherein the applying, by the WCDAB backbone of the CNN of the in-loop filter, the plurality of depth-wise separable convolutions to the first set of feature extractions to generate the set of global features comprises:

concatenating the first feature map and the second feature map;

generating a fused feature map by applying a standard convolution to the first feature map and the second feature map following the concatenating; and inputting the fused feature map into a channel attention block (CAB) to identify a set of channels from the fused feature map, wherein the fused feature map includes the set of global features.

7. The method of claim 6, wherein the generating, by the reconstruction component of the CNN of the in-loop filter, the residual map based on the set of global features comprises:

inputting the set of channels identified from the fused feature map into a channel attention branch (CAB) and a spatial attention branch (SAB) of a channel spatial joint attention block (CSAB);

generating a set of channel dimension features from the set of channels using the CAB;

generating a set of spatial dimension features from the set of channels using the SAB; and fusing the set of channel dimension features and the set of spatial dimension features to generate the residual map.

8. The method of claim 7, wherein the set of spatial dimension features are generated by applying a third depth-wise convolution of a first size and a fourth depth-wise convolution of a second size different than the first size to the set of channels.

9. A system for generating an enhanced frame at a video encoder, comprising:

a memory configured to store instructions; and a processor coupled to the memory and configured to, upon executing the instructions:

receive, by a weakly connected dense attention block (WCDAB) backbone of a convolutional neural network (CNN) of an in-loop filter, a first set of feature extractions as an input, the first set of feature extractions being associated with a reconstructed frame; and apply, by the WCDAB backbone of the CNN of the in-loop filter, a plurality of depth-wise separable convolutions to the first set of feature extractions to generate a set of global features.

10. The system of claim 9, wherein the processor coupled to the memory is further configured to, upon executing the instructions:

generate, by a reconstruction component of the CNN of the in-loop filter, a residual map based on the set of global features; and apply, by the reconstruction component of the CNN of the in-loop filter, the residual map to the reconstructed frame to generate an enhanced reconstructed frame.

11. The system of claim 10, wherein the processor coupled to the memory is further configured to, upon executing the instructions:

receive, by a feature extraction component of the CNN of the in-loop filter, a plurality of inputs generated by encoding; and apply, by the feature extraction component of the CNN of the in-loop filter, a standard convolution to the plurality of inputs to generate the first set of feature extractions.

12. The system of claim 11, wherein the plurality of inputs include the reconstructed frame, a prediction frame, a partition frame, and a quantization parameter (QP) map.

13. The system of claim 10, wherein the processor coupled to the memory is configured to, upon executing the instructions, apply, by the WCDAB backbone of the CNN of the in-loop filter, the plurality of depth-wise separable convolutions to the first set of feature extractions to generate the set of global features by:

applying a first depth-wise convolution of a residual attention block (RAB) to the first set of feature extractions to generate a first feature map with a first field; and applying a second depth-wise convolution of the RAB to the first set of feature extractions to generate a second feature map with a second field different than the first field.

14. The system of claim 13, wherein the processor coupled to the memory is configured to, upon executing the instructions, apply, by the WCDAB backbone of the CNN of the in-loop filter, the plurality of depth-wise separable convolutions to the first set of feature extractions to generate the set of global features by:

concatenating the first feature map and the second feature map;

generating a fused feature map by applying a standard convolution to the first feature map and the second feature map following the concatenating; and inputting the fused feature map into a channel attention block (CAB) to identify a set of channels from the fused feature map, wherein the fused feature map includes the set of global features.

15. The system of claim 14, wherein the processor coupled to the memory is configured to, upon executing the instructions, generate, by the reconstruction component of the CNN of the in-loop filter, the residual map based on the set of global features by:

inputting the set of channels identified from the fused feature map into a channel attention branch (CAB) and a spatial attention branch (SAB) of a channel spatial joint attention block (CSAB);

generating a set of channel dimension features from the set of channels using the CAB;

generating a set of spatial dimension features from the set of channels using the SAB; and fusing the set of channel dimension features and the set of spatial dimension features to generate the residual map.

16. The system of claim 15, wherein the set of spatial dimension features are generated by applying a third depth-wise convolution of a first size and a fourth depth-wise convolution of a second size different than the first size to the set of channels.

17. A method of training an in-loop filter model of a video encoder, comprising:

obtaining, by a processor, a compressed dataset that includes a reconstruction frame, a prediction frame, and a partition frame, the compressed dataset being associated with a first set of quantization parameters (QPs);

applying, by the processor, a deblocking filter (DBF), a sample adaptive offset (SAO), and an adaptive loop filter (ALF) to the compressed dataset; and obtaining, by the processor, a label set associated with an enhanced reconstruction frame as an output of the ALF, the label set being associated with a second set of QPs smaller than the first set of QPs.

18. The method of claim 17, further comprising:

generating, by the processor, the in-loop filter model based on a multi-stage loss function and the label set including the second set of QPs smaller than the first set of QPs.

* * * * *